United States Patent [19]

Kemp

[11] 4,416,194
[45] Nov. 22, 1983

[54] BEVERAGE PASTEURIZING SYSTEM

[75] Inventor: David M. Kemp, Naperville, Ill.

[73] Assignee: FMC Corporation, Chicago, Ill.

[21] Appl. No.: 327,238

[22] Filed: Dec. 3, 1981

[51] Int. Cl.³ .............................................. A23L 3/00
[52] U.S. Cl. .................................... 99/275; 99/323.2;
99/453; 99/483; 141/82; 165/66; 165/35
[58] Field of Search ...................... 99/275, 323.1, 483,
99/323.2, 453, 455, 452, 422, 467; 165/35, 66;
141/82; 422/308; 261/DIG. 7, 127, 128, 130,
131

[56] References Cited
U.S. PATENT DOCUMENTS

| | | | |
|---|---|---|---|
| 3,090,293 | 5/1963 | Plock | 99/323.1 |
| 3,101,041 | 8/1963 | Hallstrom | 165/66 |
| 3,237,808 | 3/1966 | Witt | 222/64 |
| 3,634,107 | 1/1972 | Cornelius | 99/275 |
| 3,780,198 | 12/1973 | Pahl | 261/DIG. 7 |
| 3,934,042 | 1/1976 | Patrick | 99/275 |
| 3,960,066 | 6/1976 | Knorr | 99/323.2 |
| 4,313,370 | 2/1982 | Kemp et al. | 99/323.1 |

Primary Examiner—Robert W. Jenkins
Attorney, Agent, or Firm—L. J. Pizzanelli; R. B. Megley

[57] ABSTRACT

A soft drink beverage pasteurizing system, utilizing heat transfer units, is diclosed. The transfer units being operable to raise the temperature of the beverage to effect pasteurization and operable by suitable temperature controls, to recirculate the beverage through one of the heat transfer units in the event pasteurization temperature is not achieved. Moreover, any tendency of the temperature to raise above pasteurization temperature is prevented by reducing the temperature of the fluid that transfers heat to the beverage.

15 Claims, 1 Drawing Figure

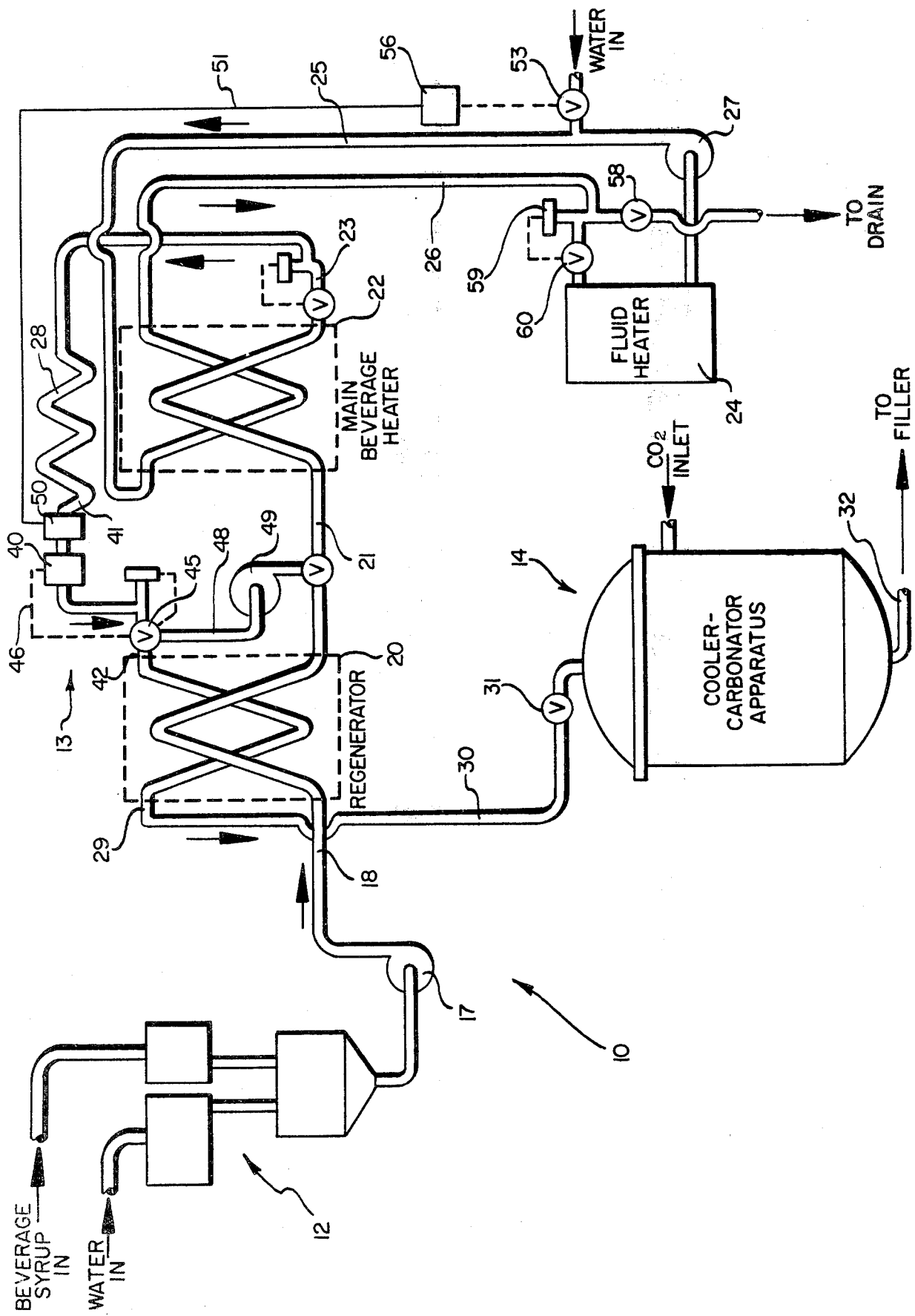

BEVERAGE PASTEURIZING SYSTEM

BACKGROUND OF THE INVENTION

This invention relates generally to beverage preparation systems, and more particularly concerns automated systems for preparing and pasteurizing soft drink beverages.

Systems for preparing and packaging soft drinks in bottles or cans have usually omitted a pasteurizing station. The feedstock beverage syrup conventionally possesses a sugar content of at least about 32° Baume; and a product of this elevated sugar content will not support microbiological growth. In practice, the beverage syrup is not diluted to a level where contaminant organisms might proliferate until immediately prior to carbonation and package filling. Thus, in many soft drink beverage preparation systems, pasteurization has not been required.

In some circumstances, however, pasteurization has been found desirable or essential. In many emerging nations, the demand for carbonated drinks and the like is of very recent origin, and experienced preparation and packaging personnel are not available. Too, sugar supplies are frequently of variable quality in these areas.

But care must be taken when pasteurizing any liquid, and these precautions can become especially important when pasteurizing soft drink fluids. If the fluid is not sufficiently heated, complete pasteurization may not occur and a potentially impure product can be produced. On the other hand, overheating the beverage can accelerate the oxidization of flavor essences, and can cause unwanted beverage coloration darkening because of sugar carmelization.

Another source of difficulty arises in applying pasteurizing systems to soft drink beverage processing systems. Various machines in the main soft drink processing system or line must often be rapidly started and stopped. This starting and stopping place causes great fluctuations in fluid flow rates in the system. All the system components, including the pasteurizing apparatus must be able to handle these rapid fluctuations in fluid flow rates without damage or malfunction.

To accommodate rapid fluid flow rate changes, some soft drink pasteurizing systems have employed means providing return circulation of the pasteurized beverage to the fresh product inlet. This recirculation flow control can aggravate color and flavor problems and, depending upon the point at which the pasteurized product is fed back into upstream portions of the system, can introduce a possible source of microbiological contamination. In addition, delivery of hot product to relatively cool upstream apparatus is a potential source of apparatus malfunction. The apparatus described and claimed in U.S. patent application Ser. No. 155,301 filed June 2, 1980 overcomes many of these problems.

SUMMARY OF THE INVENTION

It is the general object of the present invention to provide a pasteurizing apparatus especially adapted for use with a soft drink processing system which effectively and efficiently inhibits either underheating or overheating of beverage fluid passing through the apparatus.

It is a more specific object to provide pasteurizing apparatus which will prevent underheating of fluid present in the main beverage heater and a downstream beverage pasteurization holding tube.

A related object is to provide such apparatus which will shorten system start-up time, and which will not deliver unpasteurized fluid when the system is started.

Another specific object is to provide pasteurizing appparatus which will prevent overheating of fluid present in the main beverage heater and the pasteurization holding tube. A related object is to provide apparatus which will also inhibit oxidization of beverage flavor essences. Yet another object is to provide such apparatus which will prevent beverage darkening because of sugar carmelization. Still another object is to provide a pasteurizing system which will provide maximum pasteurization effect at minimal energy use.

A further object is to provide a beverage pasteurization system which is straightforward in design, yet reliable and rugged in operation.

Other objects and advantages of the invention will become apparent upon reading the following detailed description and upon reference to the drawings. To accomplish these objectives, a pasteurizing system is provided. The system comprises a heat recovery regenerator for receiving an incoming beverage liquid flow and for transferring heat from an outgoing flow of beverage liquid to that incoming beverage liquid flow. A transfer line leads the incoming beverage from the regenerator to a main beverage heater. The main beverage heater heats the incoming beverage liquid flow to a pasteurizing temperature. A fluid heater connected to the main beverage heater provides pasteurizing heat fluid to the main heater. A holding tube connected to the main heater holds the hot beverage from the main heater until the pasteurizing process is complete and transfers the hot beverage to the heat recovery regenerator, where the beverage looses heat to more incoming beverage.

A beverage temperature sensor unit in the holding tube senses excessively low beverage temperature. Diversion means connected to the holding tube downstream of the temperture sensor means but upstream of the regenerator is operated by the beverage temperature sensor unit when excessively low beverage temperature is sensed, to divert excessively cool beverage fluid in the holding tube back to the main heater in an endless path for further heating and pasteurization.

The temperature sensor unit further senses excessively high beverage temperature. A cool fluid inlet mean, controlled by the temperature sensor unit adds cool fluid to the hot fluid travelling from the fluid heater to the main beverage heater when excessively high beverage temperature is sensed. This reduces the heat imparted to the beverage in the main beverage heater and inhibits overheating of the beverage flow through the pasteurizing system.

BRIEF DESCRIPTION OF THE DRAWING

The drawing is a schematic illustration of a soft drink pasteurization system and associated apparatus constructed and arranged in accordance with the present invention.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Referring now in greater detail to the drawing, part of a soft drink preparation system 10 is shown in schematic format. Broadly speaking, this beverage preparation system 10 includes a beverage mixing unit or proportioner 12 which delivers a feed stock of prepared beverage fluid to a pasteurizer 13. Pasteurized beverage flows from the pasteurizer 13 to cooling and carbonating apparatus 14. The cooled, carbonated beverage is then transferred to filling apparatus, storage tanks, or other apparatus.

More specifically, the beverage mixing unit or proportioner 12 receives a beverage syrup or concentrate from a suitable supply tank or other source (not shown) and beverage-quality water from another suitable source (not shown). This mixing unit 12 accurately proportions the water and beverage syrup according to known principles. One eminently useful arrangement for such a beverage mixing unit is disclosed and claimed in U.S. Pat. No. 3,237,808.

The prepared beverage liquid is transferred, as by a pump 17, to an inlet 18 of the pasteurizing apparatus 13. A single pass heat recovery regenerator is connected to the inlet 18 for receiving this incoming beverage liquid flow. In the heat recovery regenerator 20, heat is transferred to the incoming beverage flow from outgoing, now-pasteurized, beverage flow. By using this heat recovery regenerator 20, much of the energy used in heating the beverage to a pasteurizing temperature can be recovered and usefully reused.

The now preliminarily heated beverage flows from the heat recovery regenerator 20 along a transfer line 21 to a main beverage heater 22. This heater 22 may be of a known variety of plate heater. Here the beverage flow is heated to a temperature equal to or above that required to bring about pasteurization. A beverage flow control valve arrangement 23 like that disclosed in U.S. patent application Ser. No. 155,301, filed June 2, 1980, could be provided, if desired, at the main beverage heater outlet.

Heat is supplied to the plate heater from a fluid heater 24. Here, a suitable heat transfer medium, such as hot water, passes from the fluid heater 24 along a hot fluid delivery line 25 to the main beverage heater 22. In the main beverage heater, the hot water or other fluid cools as it delivers its heat to the beverage flow. Relatively cool fluid then flows down a hot fluid return line 26 back to the fluid heater 24. If desired, a pump 27 can be included to encourage positive heating fluid flow.

In order that the heat imparted to the beverage liquid in the main beverage heater 22 may penetrate and be uniformly distributed, and in order that this heat have sufficient time to complete the pasteurization process, a holding tube 28 receives the hot beverage fluid from the main beverage heater 22. As illlustrated, this holding tube 28 not only permits the beverage to be maintained at a somewhat elevated temperature for some time, but it also transfers this hot fluid to the heat recovery regenerator 20. As can be envisioned, the hot beverage coming from the holding tube 28 looses heat to the subsequent incoming cool beverage in the regenerator 20. After the now-cooled, pasteurized beverage flows out an outlet 29, it flows through a transfer line 30 and appropriate valving 31 to the combination cooler and carbonator apparatus 14. Cooled, carbonated, pasteurized beverage is then transferred by a line 32 to filler apparatus, storage tanks or other appropriate apparatus (not shown).

In accordance with one aspect of the invention, it is important that the beverage flow being discharged from the holding tube 28 have been heated to a temperature sufficient to insure complete pasteurization. To insure this, a first or low beverage temperature sensor 40 is functionally inserted in the holding tube 28 at a point near the tube discharge end 41, but upstream of the regenerator beverage flow inlet 42. This low beverage temperature sensor 40 is connected to a diversion valve 45 located in the holding tube at a point downstream of the low temperature sensor 40, but upstream of the regenerator apparatus 20. Appropriate circuitry 46 provides valve control by the first beverage temperature sensor.

When excessively cool beverage fluid is sensed by the sensor 40 (that is, when the sensor 40 senses that the temperature of the beverage flow passing the sensor is less than a preset minimum), the sensor 40 actuates the diversion valve 45 so as to direct the beverage flow away from the regenerator 20 and along a diversion line 48 which leads the flow back directly to the transfer line 21. The transfer line, of course, returns the beverage flow to the main beverage heater 22 for further heating. If desired, a booster pump 49 can be provided in the diversion line 48 to encourage a positive, endless flow of beverage liquid through the main beverage heater and the holding tube.

It is a feature of the invention that when the apparatus is constructed in this way, the beverage processing apparatus or a line can be started relatively quickly. A flow of cold beverage can be directed to the main beverage heater, where heating action is started by delivery of hot water or other fluid from the fluid heater. This initial flow of beverage is then directed through the holding tube to the sensor 40. If the fluid reaching the sensor 40 is too cold, it is simply diverted through the valve 45 and the diversion line 48 back to the main beverage heater 22 for further heating. When the sensor 40 senses that beverage coming from the holding tube has been sufficiently heated to be thoroughly pasteurized, the fluid recycling action is halted and the now-hot, pasteurized fluid is directed to the regenerator 20 and downstream portions of the system.

Thus, excessively cool beverage fluid in the holding tube 28 is quickly recycled through the main beverage heater 22 for further heating and pasteurization. Oversized heaters are not required, yet no unpasteurized beverage is sent through the cooler-carbonator 14 and downstream system parts.

In accordance with another aspect of the invention, excessively high beverage temperatures in the main beverage heater 22 and holding tube 28 can be avoided. To this end, a second or high temperature sensor 50 is provided in the holding tube for sensing excessively high beverage temperature. Circuitry 51 connects this high temperature sensor 50 to a valve 53. When the sensor 50 experiences excessively high beverage temperatures, the valve 53 is opened to deliver a cool fluid, such as ambient-temperature water from an ordinary street main or other common water source, to the hot fluid delivery line 25. The mixed hot and cold water travelling up the delivery line 25 quickly reduces the heating effect applied to the beverage flowing through the main beverage heater 22, and inhibits overheating of the beverage fluid. It will be understood that the low temperature sensor 40 and the high temperature sensor 50 could be combined in a single temperature sensing unit, if desired. A timer 56 can be interposed between the high temperature sensor 50 and the cool fluid inlet valve 53 so as to admit and direct cool fluid to the main beverage heater 22 for a predetermined time only.

To drain out fluid from the heating system when an excess of fluid is caused by the admission of cool water or fluid by the cool fluid inlet valve 53, a drain valve 58 is at least indirectly connected to the main fluid heater 24. Here, this valve 58 is functionally interposed in the fluid return line 26; the excess water or fluid is simply drawn off to an appropriate drain. A pressure-sensitive actuator 59 can be used to operate a closure valve 60 so as to prevent over-pressurizing and damaging the heater 24.

The invention is claimed as follows:

1. A pasteurizing system, comprising, in combination: a heat recovery regenerator for receiving an incoming flow of beverage liquid and for transferring heat from an outgoing flow of beverage liquid to the incoming beverage liquid flow, a main beverage heater connected to the regenerator for heating the incoming beverage liquid flow to a pasteurizing temperature, a transfer line for leading the beverage from the regenerator to the main heater, a fluid heater for providing hot fluid to the main heater and thereby heat the beverage flow, a holding tube for holding the hot beverage until the pasteurizing process is complete and for transferring the hot beverage to the heat recovery regenerator, where the beverage looses heat to more incoming beverage, a low beverage temperature sensor in the holding tube for sensing excessively low beverage temperature, a diversion valve located in the holding tube downstream of the low temperature sensor but upstream of the heat recovery regenerator, and operated by the low temperature sensor, and a diversion line leading from the diversion valve to the transfer line, whereby excessively cool beverage fluid in the holding tube is quickly recycled through the main heater for further heating and pasteurization.

2. A pasteurization system according to claim 1 including booster pump means functionally interposed in said diversion line to encourage a positive, endless flow of beverage liquid through said main beverage heater and said holding tube.

3. A pasteurizing system comprising, in combination: a heat recovery regenerator for receiving an incoming flow of beverage liquid, and for transferring heat from an outgoing flow of beverage liquid to the incoming beverage liquid flow, a main beverage heater connected to the regenerator for heating the incoming beverage liquid flow to a pasteurizing temperature, a fluid heater for providing hot fluid to the main heater, a holding tube for holding the hot beverage until the pasteurizing process is complete and for transferring the hot beverage to the regenerator, where the beverage looses heat to more incoming beverage, a high temperature sensor in the holding tube for sensing excessively high beverage temperature, cool fluid inlet means controlled by the high temperature sensor for adding cool fluid to the hot fluid from the fluid heater, whereby to reduce the heat imparted to the beverage in the main beverage heater and inhibit overheating of the beverage fluid.

4. A pasteurizing system according to claim 3 wherein said cool fluid inlet means includes valve means.

5. A pasteurizing system according to claim 4 further including timer means interposed between said high temperature sensor and said cool fluid inlet valve means for admitting and directing cool fluid to the main beverage heater for a predetermined time only when an excessively high beverage flow temperature is sensed.

6. A pasteurizing system according to claim 3 further including drain means for draining out fluid when an excess of fluid is caused by an admission of cool fluid by the cool fluid inlet means.

7. A pasteurizing system according to claim 3 further including hot fluid delivery line means extending from the fluid heater to the main beverage heater for providing hot fluid to the main beverage heater, hot fluid return line means extending from the main beverage heater to the fluid heater for returning fluid from the main beverage heater to the fluid heater, said cool fluid inlet means being located in the hot fluid delivery line means for delivering cool fluid to the delivery line means and the main beverage heater so as to inhibit overheating of the beverage flow in the main heater.

8. A pasteurizing system according to claim 7 further including timer means interposed between said high temperature sensor means and said cool fluid inlet means for admitting and directing cool fluid to the main beverage heater for a predetermined time only when an excessively high beverage flow temperature is sensed.

9. A pasteurizing system according to claim 7 further including drain means in said hot fluid return line means for draining hot fluid from the system when an excess of fluid is caused by an admission of cool fluid to the hot fluid delivery line means.

10. A pasteurizing system comprising, in combination: a heat recovery regenerator for receiving an incoming beverage liquid flow and for transferring heat from an outgoing flow of beverage liquid to that incoming beverage liquid flow, a main beverage heater for heating the incoming beverage liquid flow to a pasteurizing temperature, a transfer line for leading the incoming beverage from the regenerator to the main beverage heater, a fluid heater connected to the main beverage heater for providing pasteurizing heat fluid to the main heater, a holding tube connected to the main heater for holding the hot beverage from the main heater until the pasteurizing process is complete and for transferring the hot beverage to the heat recovery regenerator, where the beverage looses heat to more incoming beverage, beverage temperature sensor means in the holding tube for sensing excessively low beverage temperature, diversion means connected to the holding tube downstream of the temperature sensor means but upstream of the regenerator and operated by the beverage temperature sensor means when excessively low beverage temperature is sensed to divert excessively cool beverage fluid in the holding tube back to the main heater in an endless path for further heating and pasteurization, the temperature sensor means further sensing excessively high beverage temperature, cool fluid inlet means controlled by the temperature sensor means for adding cool fluid to the hot fluid travelling from the fluid heater to the main beverage heater, when excessively high beverage temperature is sensed, whereby to reduce the heat imparted to the beverage in the main beverage heater and inhibit overheating of the beverage flow through the pasteurizing system.

11. A pasteurizing system according to claim 10 wherein said diversion means includes a diversion line leading from said holding tube to said transfer line, the system further including booster pump means in the diversion line for establishing a positive fluid flow through the main beverage heater, the holding tube, and the diversion line in an endless path.

12. A pasteurizing system according to claim 10 further including timer means interposed between said temperature sensor means and said cool fluid inlet means for admitting and directing cool fluid to the main beverage heater for a predetermined time only when an excessively high beverage flow temperature is sensed.

13. A pasteurizing system according to claim 10 further including hot fluid delivery line means extending from the fluid heater to the main beverage heater for providing hot fluid to the main beverage heater, hot fluid return line means extending from the main beverage heater to the fluid heater for returning fluid from the main beverage heater to the fluid heater, and cool fluid inlet means in the hot fluid delivery line means for delivering cool fluid to the delivery line means and the main beverage heater so as to inhibit overheating of the beverage flow in the main heater.

14. A pasteurizing system according to claim 13 further including timer means interposed between the temperature sensor means and said cool fluid inlet valve for admitting and directing cool fluid to the main beverage heater for a predetermined time only when an excessively high beverage flow temperature is sensed.

15. A pasteurizing system according to claim 13 including drain means in said hot fluid return line means for draining hot fluid from the system when an excess of fluid is caused by an admission of cool fluid to the cool fluid inlet means and hot fluid delivery line means.

* * * * *